(No Model.)
E. S. COBB.
HYDRAULIC APPARATUS.
No. 587,427. Patented Aug. 3, 1897.
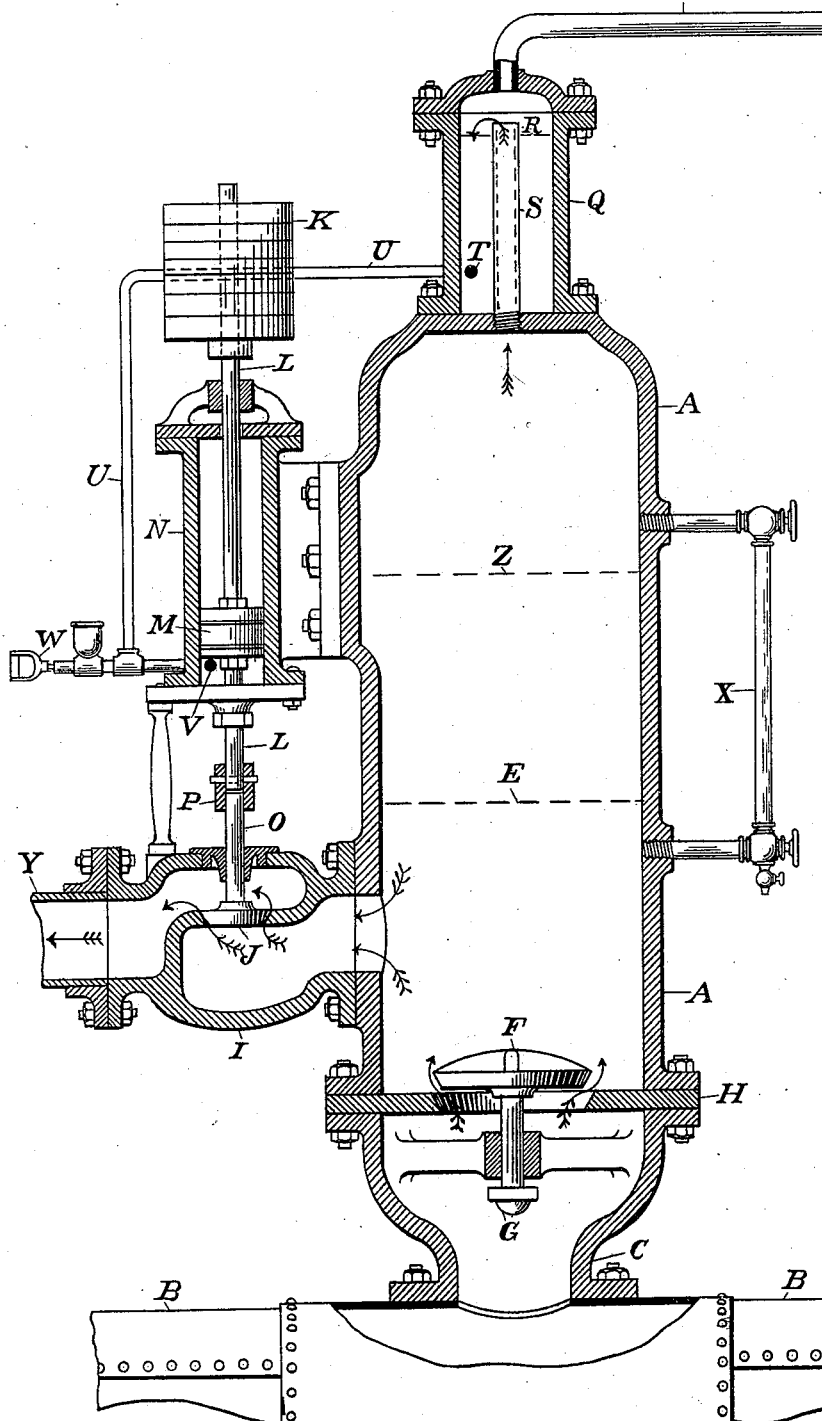
Witnesses
K. Lockwood Nevine.
H. T. Hesselmeyer.
Inventor
Edward S. Cobb
By his Attorney
J. Richards

UNITED STATES PATENT OFFICE.

EDWARD S. COBB, OF SAN FRANCISCO, CALIFORNIA.

HYDRAULIC APPARATUS.

SPECIFICATION forming part of Letters Patent No. 587,427, dated August 3, 1897.

Application filed November 10, 1896. Serial No. 611,625. (No model.)

*To all whom it may concern:*

Be it known that I, EDWARD S. COBB, a citizen of the United States, residing in the city and county of San Francisco, State of California, have invented certain new and useful Improvements in Hydraulic Apparatus, of which the following is a specification.

My invention relates to devices for preventing water-ram or impulsive shock in long lines of service-pipe when the consumption of water and consequent velocity of flow in the pipes is variable and to a means of absorbing such impulsive force of the water without resilient action of compressed air contained in an air vessel.

My improvement consists in an air vessel to be placed at or near the point of use or delivery of water from the pipe, provided with a check-valve that permits water to flow from the service-pipe to the air vessel, but prevents water from reacting or flowing back from the air vessel to the pipe; also provided with a waste-valve that permits water to escape from the air vessel when the pressure therein exceeds that of the service-pipe, all the operations being automatic.

The object of my invention is to prevent the rupture of long service-pipes and vessels communicating therewith when the consumption of water is irregular, as in driving water-wheels, or in any case when the velocity of flow through the pipe-line has to be suddenly changed, and to maintain a nearly constant pressure of water in the pipe-line regardless of sudden variations in the velocity of flow.

To better illustrate, consider a line of pipe flowing full of water at a normal velocity under a high head or pressure and discharging through an orifice of variable cross-section. Let this pipe-line be provided with an air-chamber placed at a point preferably near the point of discharge. Suppose that the cross-section of the discharge-orifice be suddenly decreased. Then the normal velocity of flow must be as suddenly checked, and the energy of the moving mass will be spent in, first, compressing to a greater degree the air confined in the air-chamber, and, second, in giving an increased velocity of flow through the reduced discharge area. The air in the air vessel thus compressed above its normal pressure will react and cause a return flow or rebound of water in the pipe-line, the energy of which will be as great as the original energy of flow less the loss due to friction, and this alternate flow and rebound will continue until friction has absorbed the excess energy of the moving mass.

The alternate flow and rebound above referred to cause coincident increase and decrease of velocity of flow at the discharge-orifice, and the object of my invention is to entirely prevent the reaction caused by the compressed air and attendant succession of fluctuations of flow and pressure.

Similar phenomena to that described above also occur when the area of discharge is suddenly increased, and there will be the similar fluctuations of flow and pressure as above mentioned. To provide for the forces thus developed when the flow of water is varied and to prevent resilient reaction, I provide apparatus, as shown in the drawing herewith, which will now be referred to.

A is an air vessel attached to a water-pipe B by a nipple C in the usual manner. This vessel A is filled with air, which may be entrapped or forced through a pipe D and compressed to the normal or static pressure in the pipe B until the water-line is at E or some other point, according to the volume supplied.

Near the bottom of the main vessel A, I place a check-valve F, guided by a stem G, opening freely inward, and when shut seating itself in the plate H.

At the side of the main vessel A, I attach a chamber I, having a valve J, opening outward and held shut when not in action by the weights K, acting through the stem L and heavy enough to close the valve J against the normal pressure in the pipe B and also against the normal pressure in the main pipe acting under the piston M, as will be presently explained.

To operate the valve J when positive and sensitive action is required, I provide a piston M, moving in a cylinder N and attached to the stem L, this latter being preferably joined to the valve-stem O by a collar P, fastened to the stem L, but loose on the valve-stem O when this kind of valve is used.

To operate the piston M, I provide by preference a receiver Q, which is made larger in capacity than the cylinder N and filled with oil or other non-congealing liquid up to the line R, or sufficiently to fill the cylinder N without sinking below the discharge-way at T. From this discharge-way T a pipe U connects to the inlet V in the cylinder N beneath the piston M.

The oil in the receiver Q is subjected to the same pressure as the air in the top of the main vessel A, a pipe S forming an open connection between these chambers. In case of any of the oil escaping an additional supply is forced in by a hand-pump W.

An indicating-tube X is applied at the side of the main vessel A to show the rise and fall of the water in the vessel A. Waste water from the valve J is carried off by the pipe Y.

The operation is as follows: Supposing the pipe B to be a thousand feet in length and thirteen and one-half inches internal diameter, the water therein flowing at the rate of five feet per second under a head of two hundred and twenty-five feet, and that the discharge through a nozzle therefrom is five cubic feet per second, then if the conditions of use require that one-fifth of the supply be shut off in one second of time, changing the flow to four feet per second, the augmented energy of the flowing water due to this diminished velocity will be eight thousand seven hundred and fifty foot-pounds per second, and this surplus energy will act to further compress the air in the air-chamber. The work done in performing this compression will be directly as the surplus energy of the flowing water. In this case the valve F rises, the surplus water flows up into the vessel A, and the air in this vessel will be compressed up to the line Z or some other point, according to the energy to be absorbed. As soon as there is an equilibrium of pressure in the pipe B and in the main vessel A the valve F will close by its gravity and prevent reaction of the highly-compressed water and air in the vessel A. This increased pressure will at the same time act through the pipe S on the oil contained in the vessel or receiver Q and through the pipe U on the bottom of the piston M, raising the stem L and weights K, permitting the valve J to open and water to escape from the main vessel A until it sinks again to the line E or to a pressure equal to that in the pipe B under normal conditions. Then the valve J will close by action of the weights K, and the oil beneath the piston M will at the same time be forced back through the pipe U into the receiver Q. This operation will be repeated as often as the pressure in the main pipe B rises above that due to the normal head and pressure of the water. The quantity of water escaping through the pipe Y will be as the amount of momentum or surplus energy above the normal pressure delivered against the air in the vessel A.

By the closing of the valve F, preventing resilient action of the air in the vessel A, there will be but one impulse caused by diminishing the velocity of flow in the pipe B, and no repeated impulses, as in the case of air vessels open each way to the main pipe. These, acting like a spring, set up oscillations that, as before remarked, are dangerous and render the attainment of constant pressure at the point of discharge impossible.

It will be understood that the pipe U can lead direct from the main vessel A, so that either water or air can act on the piston M instead of the oil contained in the receiver Q. This latter avoids corrosion or other obstruction to the piston's action. A spring can be substituted for the weights K, and the various elements can be differently arranged. I have shown them in such form and relation as permits clear explanation. It will also be understood that the valves F and J can be of any suitable kind. For example, the one F may be a flap-valve and the one J a stop-valve of any kind; also, that the latter may be a simple stop-valve directly loaded with a weight or resisted by a spring and opened by the pressure beneath when sensitive action is not required.

Having thus explained the nature and objects of my invention and the manner of its application, what I claim as new, and desire to secure by Letters Patent, is—

1. In hydraulic apparatus, a pipe subjected to varying pressure, an air vessel communicating therewith, a check-valve between the pipe and air vessel, opening outward from the pipe and closing to prevent return flow; in combination with a waste-valve actuated by augmented pressure in the air vessel, and discharging therefrom to equalize the pressure in the air vessel with that in the main pipe, substantially as described.

2. In hydraulic apparatus, a pipe subjected to varying pressure, an air vessel and a check-valve therein to prevent backflow from the air vessel to the pipe, a waste-valve to reduce the pressure in the air vessel, the latter valve loaded to maintain a predetermined pressure in the air vessel, in the manner and for the purposes substantially as described.

3. In hydraulic apparatus, a pipe subject to varying pressure, an air vessel and check-valve therein, a waste-valve operated by a piston, the latter communicating with the air vessel and actuated by pressure therefrom, all combined and operating substantially as described.

In testimony whereof I have hereunto affixed my signature in the presence of two witnesses.

EDW. S. COBB.

Witnesses:
JAMES L. KING,
KATE L. NEVINS.